(12) United States Patent
Kang

(10) Patent No.: US 9,991,644 B2
(45) Date of Patent: Jun. 5, 2018

(54) CABLE ASSEMBLY AND MOTOR HAVING THE SAME

(71) Applicant: LG INNOTEK CO., LTD., Seoul (KR)

(72) Inventor: Young Gu Kang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days. days.

(21) Appl. No.: 15/264,259

(22) Filed: Sep. 13, 2016

(65) Prior Publication Data

US 2017/0077653 A1    Mar. 16, 2017

(30) Foreign Application Priority Data

Sep. 14, 2015 (KR) .......................... 10-2015-0129749

(51) Int. Cl.
| | |
|---|---|
| *H02K 11/00* | (2016.01) |
| *H01R 13/6592* | (2011.01) |
| *H02K 5/22* | (2006.01) |
| *H01R 4/16* | (2006.01) |
| *H01R 43/16* | (2006.01) |

(52) U.S. Cl.
CPC .......... *H01R 13/6592* (2013.01); *H01R 4/16* (2013.01); *H01R 43/16* (2013.01); *H02K 5/225* (2013.01)

(58) Field of Classification Search
CPC ........ H02K 5/22; H02K 5/225; H01R 12/596; H01R 13/6592
USPC ............................................. 310/71; 439/98
See application file for complete search history.

(56) References Cited

U.S. PATENT DOCUMENTS

| | | | | |
|---|---|---|---|---|
| 5,418,330 A * | 5/1995 | Rook | ................... | H01R 9/0512 174/75 C |
| 6,439,899 B1 * | 8/2002 | Muzslay | ............ | H01R 13/5216 439/108 |
| 6,815,610 B2 * | 11/2004 | Kuboshima | ............ | H01R 9/032 174/360 |
| 7,625,224 B2 * | 12/2009 | Jaouen | ............. | H01R 13/65802 439/98 |
| 8,460,015 B2 * | 6/2013 | Deno | ................... | H01R 9/0518 174/78 |
| 8,729,754 B2 * | 5/2014 | Fujii | ..................... | H02K 3/522 310/68 B |
| 8,779,641 B2 * | 7/2014 | Fujii | ..................... | H02K 3/522 310/68 B |

(Continued)

*Primary Examiner* — Hae Moon Hyeon
(74) *Attorney, Agent, or Firm* — Birch, Stewart, Kolasch & Birch, LLP

(57) ABSTRACT

A cable assembly includes a cable having a conductive core, an electromagnetic wave shielding layer, and an internal insulation layer between the conductive core and the electromagnetic wave shielding layer, a connector connected to one end of the cable, and a ground terminal portion disposed at the connector and having a first terminal electrically connected to the electromagnetic wave shielding layer and a second terminal disposed to expose from the connector, wherein the first terminal and the second terminal are connected by bending. The cable assembly provides an advantageous effect of implementing a grounding arrangement at the cable assembly coupled to the motor in a vertical direction that is parallel with the shaft direction of the motor by forming the first terminal and second terminal of the ground terminal portion by bending.

15 Claims, 12 Drawing Sheets

(56) References Cited

U.S. PATENT DOCUMENTS

| | | | | |
|---|---|---|---|---|
| 2002/0043883 A1* | 4/2002 | Shimizu | ............... | H01R 13/405 |
| | | | | 310/71 |
| 2012/0276762 A1* | 11/2012 | Hohner | ................ | H01R 9/0527 |
| | | | | 439/98 |
| 2014/0202763 A1* | 7/2014 | Adachi | ................ | H01R 13/504 |
| | | | | 174/72 A |
| 2016/0036163 A1* | 2/2016 | Ebisawa | .............. | H01R 13/639 |
| | | | | 439/358 |

* cited by examiner

CABLE ASSEMBLY AND MOTOR HAVING THE SAME

CROSS-REFERENCE TO RELATED APPLICATION

This application claims priority to and the benefit of Korean Patent Application No. 2015-0129749, filed on Sep. 14, 2015, the disclosure of which is incorporated herein by reference in its entirety.

BACKGROUND

1. Field of the Invention

The present invention relates to an cable assembly and a motor comprising the cable assembly.

2. Discussion of Related Art

Generally, a motor comprises a stator disposed at an inner circumferential surface of a housing and a rotor disposed at the center of the stator. The rotor rotates by electromagnetically interacting with the stator and transfers power to the outside. However, the motor generates electromagnetic wave noise during high-speed rotation.

In addition, generally, an inverter which drives a motor causes electromagnetic wave noise having frequency bands spanning from several kilohertz (KHz) to several dozens of megahertz (MHz) due to high-speed switching operation property of a power switching semiconductor device.

Such electromagnetic wave noise influences operation of the device itself in which the electromagnetic wave noise is generated or other devices and thus becomes a cause of degraded functioning or a device malfunction.

For this reason, regulatory criteria for electromagnetic wave noise are strictly applied to vehicles, in the automobile industry.

SUMMARY OF THE INVENTION

The present invention is directed to providing an cable assembly and a motor comprising the cable assembly capable of quickly removing electromagnetic wave noise generated from an external power supply and motor.

In addition, the present invention is directed to providing an cable assembly and a motor comprising the cable assembly capable of implementing a grounding arrangement at the cable assembly that is coupled to a motor in the vertical direction which is parallel with a shaft direction of the motor.

The technical objectives of the present invention are not limited to the above objectives, and other objectives may become apparent to those of ordinary skill in the art based on the following descriptions.

According to an aspect of the present invention, there is provided an cable assembly comprising: a conductive core, an electromagnetic wave shielding layer, and a cable covering the electromagnetic wave shielding layer; a connector connected to the cable; and a ground terminal portion disposed at the connector and having a first terminal electrically connected to the electromagnetic wave shielding layer and a second terminal disposed to be exposed at the connector, wherein the first terminal and the second terminal are connected by bending.

The ground terminal portion may comprise a third terminal which electrically connects the electromagnetic wave shielding layer with the first terminal.

The second terminal may form a ground plane in a direction perpendicular to a length direction of the cable.

The first terminal may comprise a terminal body formed to be bent from the second terminal in the length direction of the cable.

The first terminal may comprise a bent contact section formed to be bent from the terminal body to be in contact with the third terminal.

The third terminal may be fitted to surround a perimeter of the electromagnetic wave shielding layer of the cable.

A plurality of third terminals into which a plurality of cables are individually inserted may be provided, and the first terminal may comprise a plurality of bent contact sections individually in contact with the plurality of third terminals.

The connector may comprise a body portion coupled to the cable and having the ground terminal portion, and a power supply terminal comprised in the body portion and configured to protrude in a direction bent from the length direction of the cable to be electrically connected to the cable.

The body portion may comprise an open region formed to be perpendicular to the length direction of the cable to expose the second terminal.

The body portion may comprise a second body having the power supply terminal and a first body having the second body and the ground terminal portion.

The second terminal may comprise a first engaging portion, and the second body may comprise a second engaging portion for engaging with the first engaging portion.

The second terminal may comprise an elastic pressing portion formed to protrude from the ground plane.

The elastic pressing portion may be formed using a cut section for which the ground plane is cut to protrude.

The first terminal, the second terminal, and the third terminal may be integrally formed.

According to another aspect of the present invention, there is provided a motor comprising: a rotating shaft; a rotor having a hole in which the rotating shaft is disposed; a stator disposed outside of the rotor and having a coil; a bus bar connected to the coil and disposed at an upper side of the stator; and an cable assembly connected to the bus bar, wherein the cable assembly comprises a conductive core, an electromagnetic wave shielding layer, and a cable covering the electromagnetic wave shielding layer, a connector connected to the cable, and a ground terminal portion disposed at the connector and having a first terminal electrically connected to the electromagnetic wave shielding layer and a second terminal disposed to be exposed at the connector to be in contact with a cover of the motor, wherein the first terminal and the second terminal are connected by bending.

The connector may comprise a body portion coupled to the cable and having the ground terminal portion, and a power supply terminal comprised in the body portion and formed to be bent from a length direction of the cable to electrically connect the conductive core of the cable with the bus bar.

The body portion may comprise a first body having the power supply terminal, and a second body having the first body and the ground terminal portion and coupled to a housing of the motor.

The body portion may comprise a stepped surface formed to be perpendicular to the length direction of the cable and configured to form an open region to expose the second terminal to be in contact with the cover.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, preferred embodiments of the present invention will be described in detail with reference to the accompanying drawings. Objectives, advantages and new features of the present invention will become more apparent by the reference to the following detailed descriptions and preferred embodiments associated with the accompanying drawings. And, the terminologies and words used in this specification comprising the claims should not be limited or interpreted by normal or lexical meanings. Based on the principle that an inventor can appropriately define terminologies for explaining the invention in the best way possible, the terminologies may have to be interpreted by meanings and concepts according to the aspects of the inventive concept. In the description, detailed descriptions of well-known technologies related to the present invention will be omitted when they may unnecessarily obscure the subject matters of the invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of the present invention. The term "and/or" comprises any and all combinations of one or more of the associated listed items.

Figure 1:
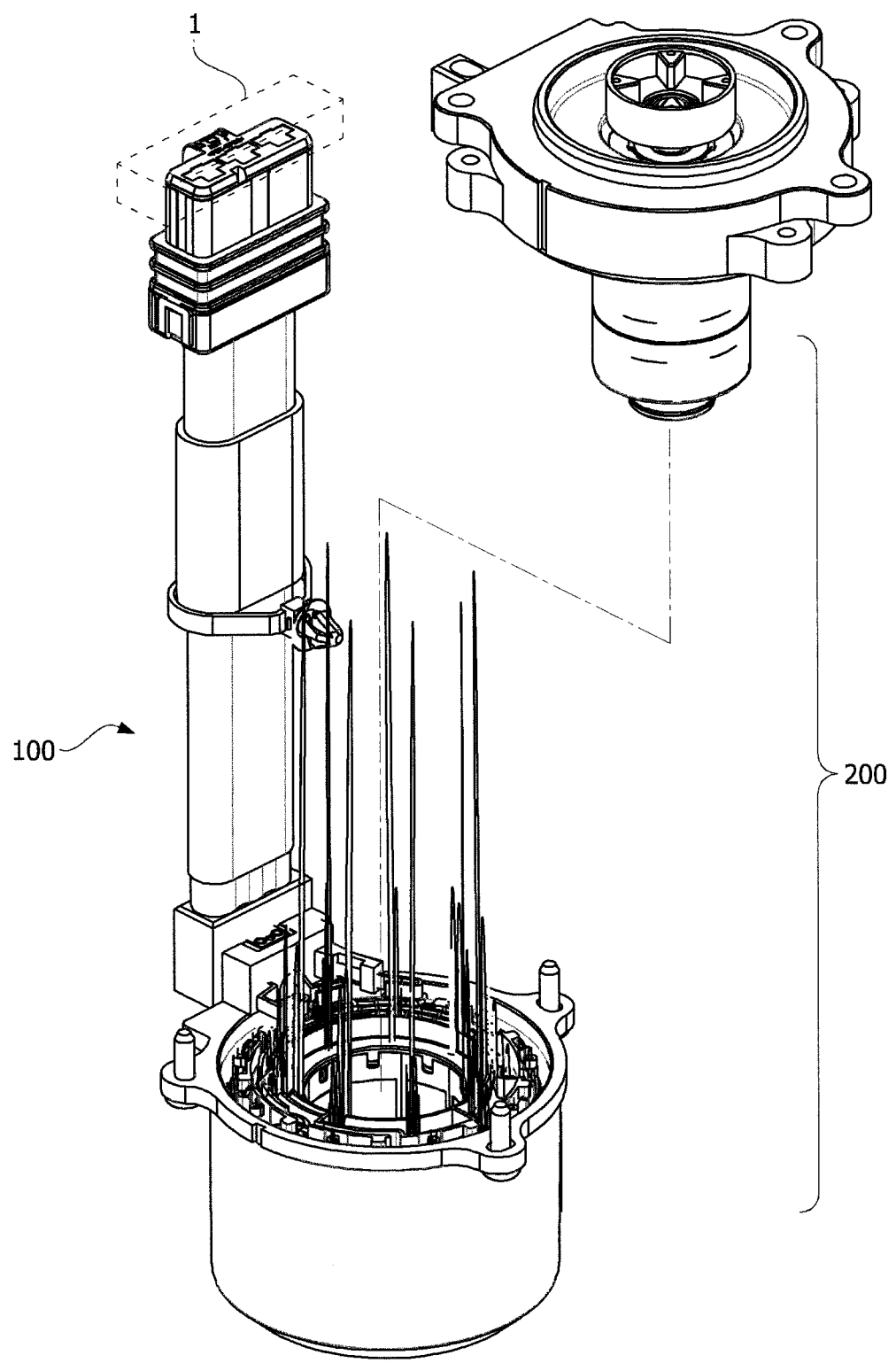
FIG. 1 is a view illustrating a motor according to one embodiment of the present invention.
Figure 2:
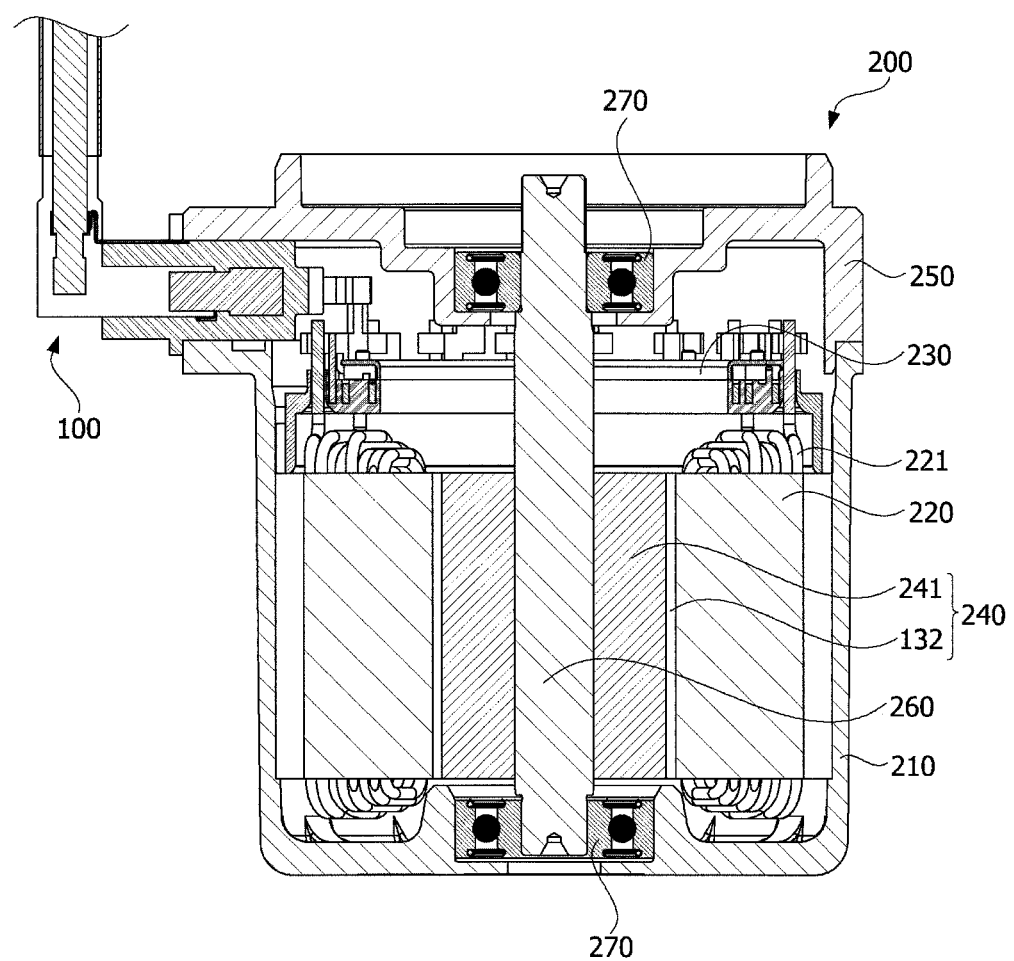
FIG. 2 is a view of the motor illustrated in FIG. 1.

FIG. 1 is a view illustrating a motor according to one preferred embodiment of the president invention, and FIG. 2 is a view illustrating the motor of FIG. 1.

Referring to FIG. 1, a motor according to one embodiment of the present invention may comprise an cable assembly 100 in a motor 200. The cable assembly 100 may connect a power supply unit 1 to the motor 200. The power supply unit 1 may apply three-phase power to the motor 200 via the cable assembly 100. The power supply unit 1 may comprise an inverter connected to a vehicle battery.

Figure 3:
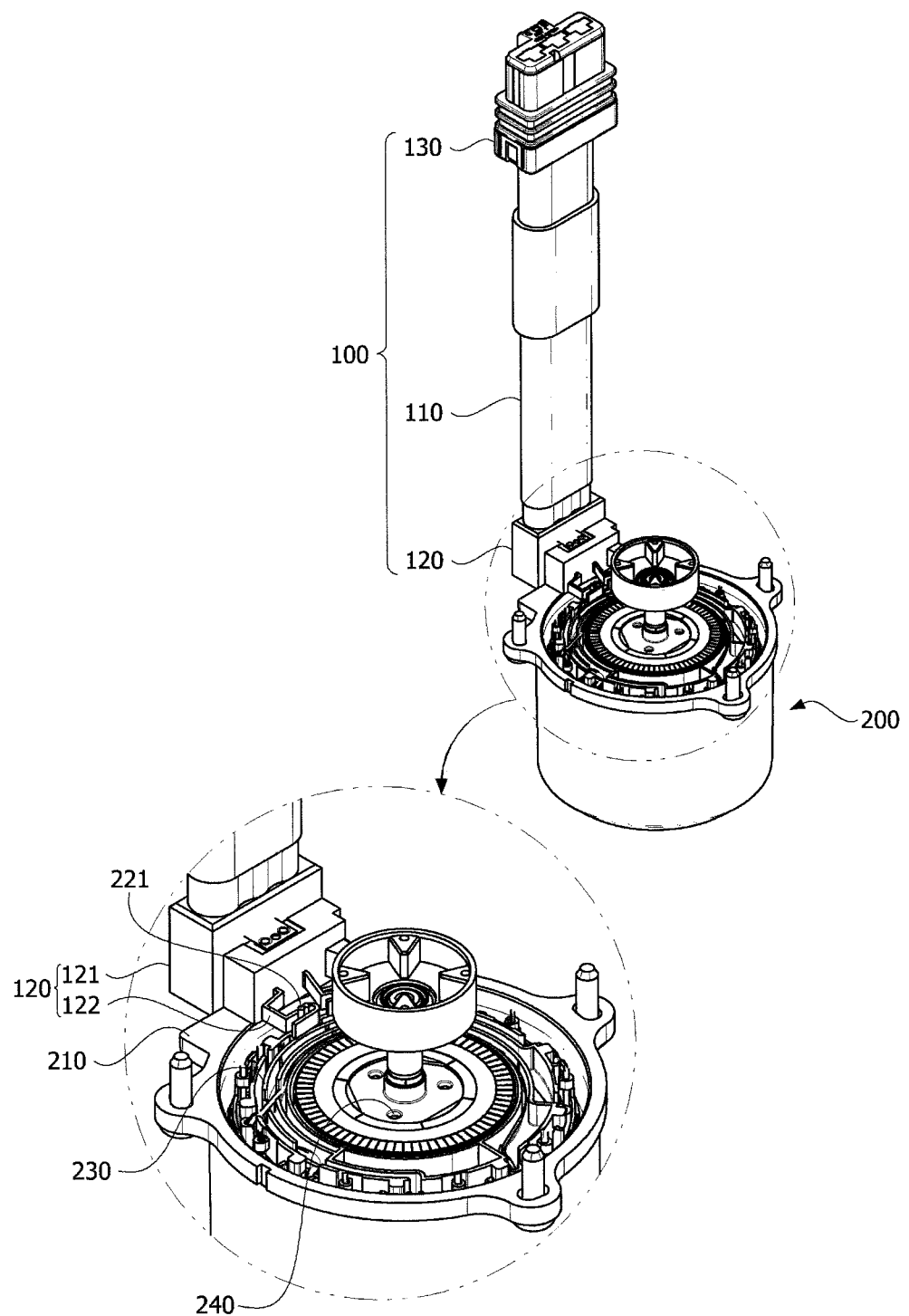
FIG. 3 is a view illustrating a connection between a connector and a bus bar.

Referring to FIGS. 2 and 3, the motor 200 may comprise a housing 210, a stator 220 disposed in the housing 210, a bus bar 230 connected to a coil 221, a rotor 240 rotatably coupled to the stator 220, and a cover 250 coupled to the housing 210.

The housing 210 is formed in a cylindrical shape to provide a space in which the stator 220 and the rotor 240 may be installed. Shape or material of the housing 210 may be diversely modified, but a metal material which conducts electricity may be selected.

The housing 210 shields the stator 220 and the rotor 240 from the outside. In addition, the housing 210 may further comprise a cooling structure (not shown) so that inside heat may be easily radiated. An air-cooled or water-cooled structure may be chosen as the cooling structure, and the shape of the housing 210 may be properly modified depending on the cooling structure.

The stator 220 is inserted into an internal space of the housing 210. The stator 220 may comprise a wound coil 221. The stator 220 may be integrally formed in a ring shape or formed in a shape in which a plurality of segmented cores are coupled.

The rotor 240 is disposed to be rotatable with the stator 220. The rotor 240 may be formed by installing a magnet 132 at an outer circumferential surface of a rotor core 241. The rotor 240 may rotate by electromagnetically interacting with the stator 220.

A rotating shaft 260 is coupled to the center of the rotor 240. Accordingly, the rotating shaft 260 rotates in conjunction with rotation of the rotor 240. The rotating shaft 260 is rotatably supported by bearings 270 disposed at opposite ends thereof.

The bus bar 230 is electrically connected to the coils 221 wound on the stator 220 and may comprise terminals connecting U-phase, V-phase and W-phase.

The cover 250 coupled to an open surface of the housing 210 may seal the stator 220 and the rotor 240. The cover 250 may be formed of a metal material which conducts electricity and is coupled to the housing 210 by screw-coupling or the like.

FIG. 3 is a view illustrating a connection between a connector and a bus bar.

Referring to FIG. 3, the cable assembly 100 may comprise a connector 120 connected to the motor 200, a power supply connector 130 connected to the power supply unit (1 of FIG. 1), and a cable 110 which connects the connector 120 with the power supply connector 130.

The connector 120 may comprise a plurality of power supply terminals 122 connected to the bus bar 230. The plurality of power supply terminals 122 may be connected to the U-phase, V-phase and W-phase coils 221 of the bus bar 230.

Figure 4:
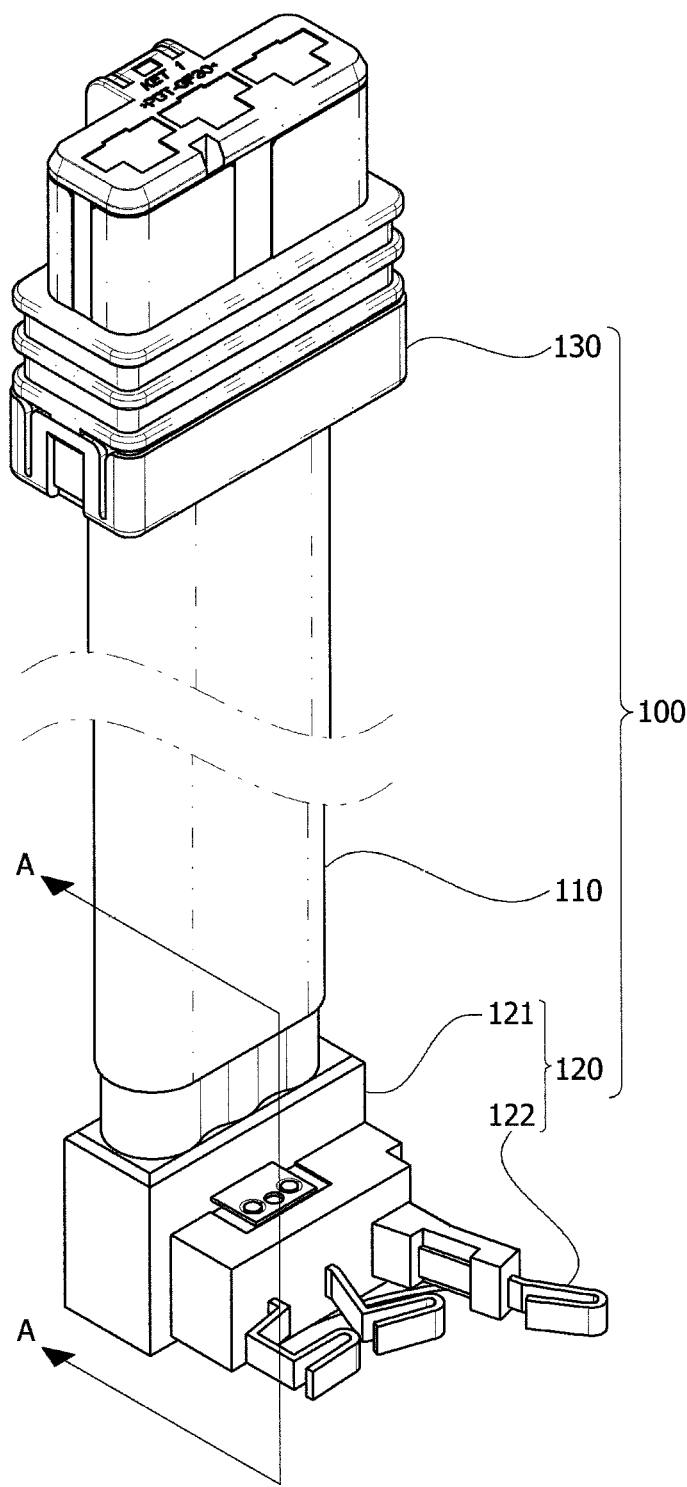
FIG. 4 is a perspective view illustrating an cable assembly according to one embodiment of the present invention.
Figure 5:
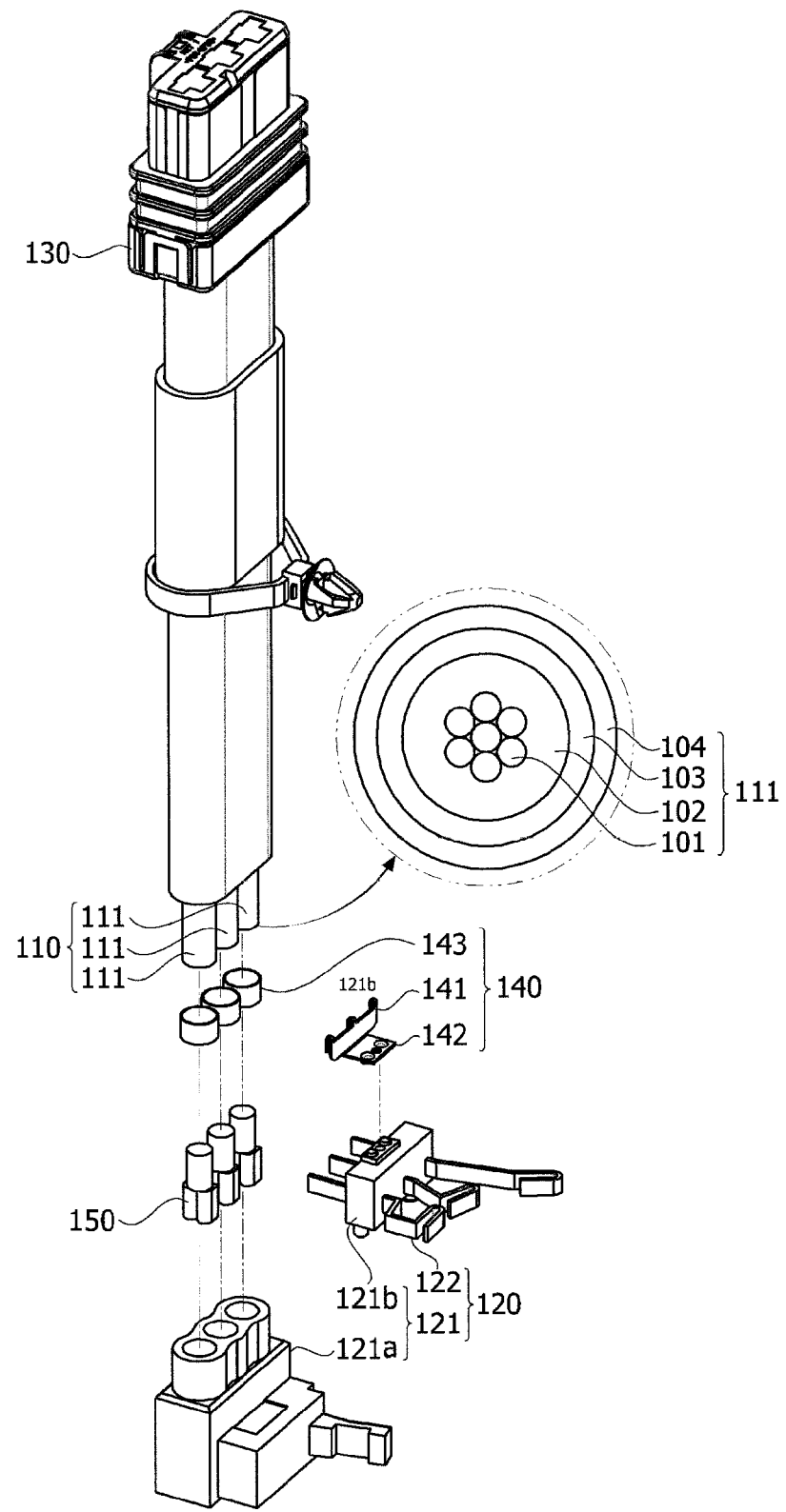
FIG. 5 is an exploded perspective view illustrating an cable assembly according to one embodiment of the present invention.

FIG. 4 is a perspective view illustrating the cable assembly according to one embodiment of the present invention, and FIG. 5 is an exploded perspective view illustrating the cable assembly according to one embodiment of the present invention.

Referring to FIGS. 4 and 5, the cable assembly 100 according to one embodiment of the present invention may comprise a cable 110, a connector 120 connected to one side of the cable 110, a power supply connector 130 connected to the other side of the cable 110, and a ground terminal portion 140.

The cable 110 may be formed as a combination of a plurality of sub cables 111.

Each of the sub cables 111 may comprise a conductive core 101, an internal insulation layer 102 which covers the conductive core 101, an electromagnetic wave shielding layer 103 which covers the internal insulation layer 102, and an external insulation layer 104 which covers the electromagnetic wave shielding layer 103.

The conductive core 101 is formed of a conductive material comprising copper and iron and has a predetermined length. The internal insulation layer 102 entirely surrounds the conductive core 101, and an insulating material may be selected therefor. The electromagnetic wave shielding layer 103 surrounds the internal insulation layer 102 and may be a braided shield which shields electromagnetic waves. The external insulation layer 104 surrounds the electromagnetic wave shielding layer 103, and an insulating material is selected therefor. The internal insulation layer 102 and the external insulation layer 104 may have an identical insulation material.

The connector 120 may comprise a plurality of power supply terminals 122 electrically and individually connected to the conductive cores 101 of the plurality of sub cables 111, and a body portion 121 which fixes the plurality of power supply terminals 122 and end portions of the plurality of sub cables 111. As described above, the power supply terminals 122 may be electrically connected to the bus bars 230 of the motor 200.

The power supply connector 130 may be connected to an external power supply unit.

Figure 6:
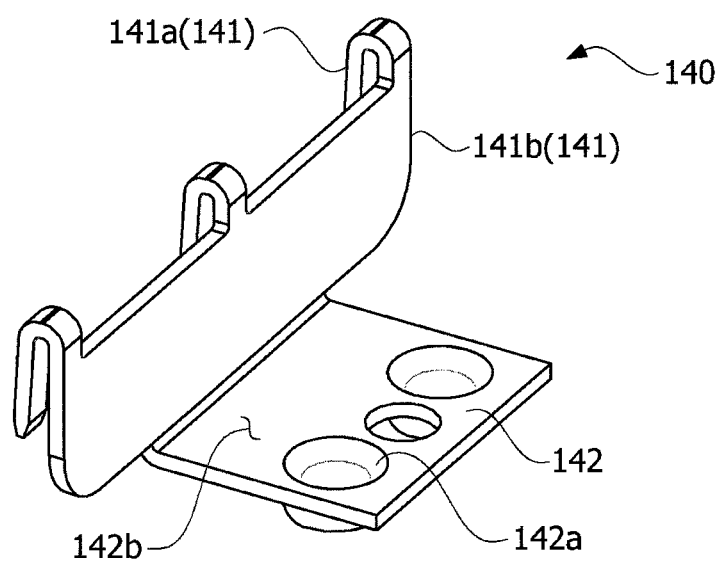
FIG. 6 is a view illustrating a ground terminal portion.
Figure 7:
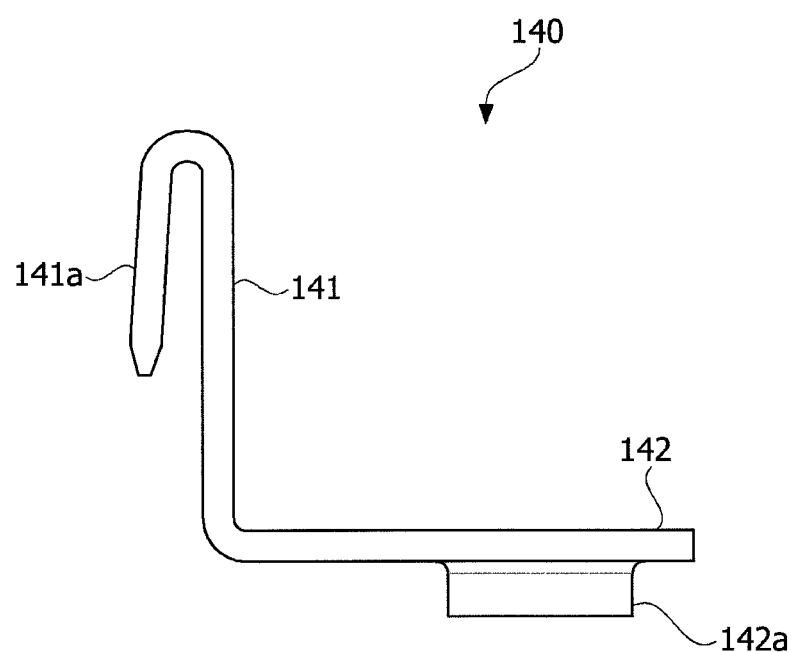
FIG. 7 a view illustrating a side surface of the ground terminal portion of FIG. 6.

FIG. 6 is a view illustrating a ground terminal portion, and FIG. 7 is a view illustrating a side surface of the ground terminal portion of FIG. 6. In FIGS. 6 and 7, it is intended that only portions of main features are clearly illustrated to provide clear understanding about the concept of the present invention, from which various modifications in illustration are expected, but the scope of the present invention need not be limited by the particular shapes illustrated in the drawings.

Referring to FIGS. 5 to 7, the ground terminal portion 140 may comprise a first terminal 141, a second terminal 142, and a third terminal 143. Here, the first terminal 141 and the second terminal 142 may only be classified and described by shapes and functional properties but are actually one connected body. In addition, the third terminal 143 is fitted to surround a perimeter of the electromagnetic wave shielding layer 103 of the cable 110 from which the external insulation layer 104 is removed, and thereby the third terminal 143 serves the role of connecting the second terminal 142 with the electromagnetic wave shielding layer 103.

As illustrated in FIG. 5, the third terminal 143 described above may be implemented by a conductive member in a ring shape.

Meanwhile, in the description of the ground terminal portion 140, although the first terminal 141, the second terminal 142, and the third terminal 143 are illustrated as separate members in the drawings, the present invention is not limited thereto, and the first terminal 141 and the third terminal 143 may be integrally formed. That is, one integrated terminal in which the first terminal 141, the second terminal 142, and the third terminal 143 are connected may also be implemented.

The first terminal 141 may be electrically connected to the electromagnetic wave shielding layer 103 of the cable 110 through the third terminal 143.

The first terminal 141 may comprise a terminal body 141b and a bent contact section 141a. The terminal body 141b may be implemented in a flat plate shape and disposed along a length direction of the cable 110. The bent contact section 141a may be formed to be sharply bent downward from an upper end of the terminal body 141b. The bent contact section 141a comes into contact with the third terminal 143 and may be disposed along the length direction of the cable 110.

As many bent contact sections 141a described above may be provided as the number of the sub cable 110.

The second terminal 142 is disposed to be exposed at the connector 120 to be in contact with the cover 250 when the cover 250 is coupled to the housing 210 of the motor 200.

The second terminal 142 may be formed to be perpendicularly bent from a lower end of the first terminal 141. That is, the second terminal 142 may be implemented in a flat plate shape to form a ground plane 142b and is formed to be perpendicular to the first terminal 141 disposed in the length direction of the cable 110.

Since the cable assembly 100 of the motor according to preferred one embodiment of the present invention is connected to the motor 200 in a vertical direction that is parallel with a shaft direction of the motor 200, the first terminal 141 which comes in contact with the third terminal 143 connected to the cable 110 is vertically disposed, and the second terminal 142 which comes in contact with the cover 250 is horizontally disposed such that the first terminal 141 and the second terminal 142 may be formed bent as illustrated in FIG. 7.

Meanwhile, a first engaging portion 142a for engaging with the body portion 121 of the connector 120 is formed at the second terminal 142.

Figure 8:
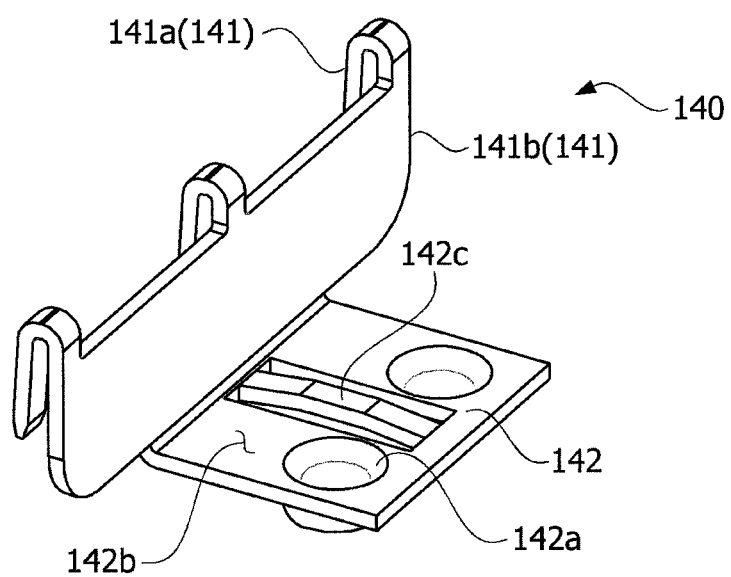
FIG. 8 is a view illustrating a ground terminal portion of another embodiment.

FIG. 8 is a view illustrating a ground terminal portion of another embodiment.

Referring to FIG. 8, an elastic pressing portion 142c may be formed at a ground plane 142b of a second terminal 142 of a ground terminal portion 140. The elastic pressing portion 142c provides elasticity in a shaft direction of a motor 200 to serve the role of increasing contact with the cover 250.

Such an elastic pressing portion 142c may be formed using a cut section for which a portion of the ground plane 142b is cut and protrudes.

Figure 9:
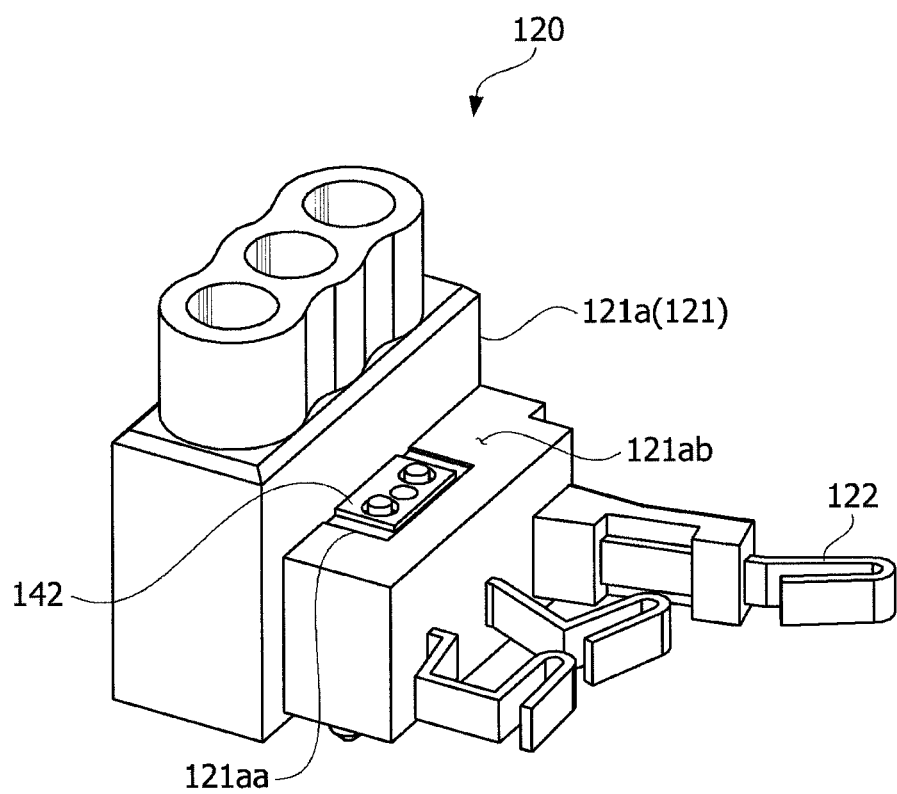
FIG. 9 is a view illustrating a connector.
Figure 10:
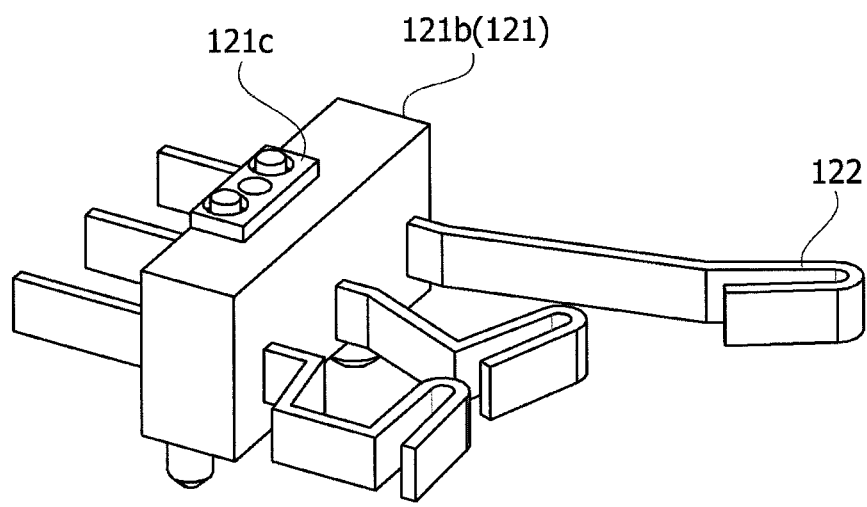
FIG. 10 is a view illustrating a second body and a power supply terminal of the connector illustrated in FIG. 9.

FIG. 9 is a view illustrating the connector, and FIG. 10 is a view illustrating a second body and the power supply terminals of the connector of FIG. 9.

Referring to FIG. 9, the connector 120 may comprise the body portion 121 and the power supply terminals 122. The body portion 121 covers a region in which the power supply terminals 122 and the sub cables 111 are electrically connected. The body portion 121 may be formed of an injection-molded insulation material. As an example, the body portion 121 may be a plastic material.

Specifically, the body portion 121 may comprise a first body 121a and a second body 121b. The second body 121b in a state in which the power supply terminal 122 is fixed is injection-molded together with the ground terminal portion 140 and is positioned inside the first body 121a. Here, the first body 121a may be formed by injection-molding after fixing a position of the ground terminal portion 140 in a state in which the first engaging portion 142a of the ground terminal portion 140 engages with a second engaging portion 121c of the second body 121b.

In addition, the direction of the power supply terminals 122 may be perpendicular to the length direction of the cable 110 entered into the body portion 121.

Meanwhile, the power supply terminals 122 may be electrically and individually connected to the sub cables 111 by a connection member (150 of FIG. 5).

An open region 121aa may be formed at the body portion 121 to expose the second terminal 142 of the ground terminal portion 140. The open region 121aa may be formed on a stepped surface 121ab formed to be in contact with the cover 250.

Figure 11:
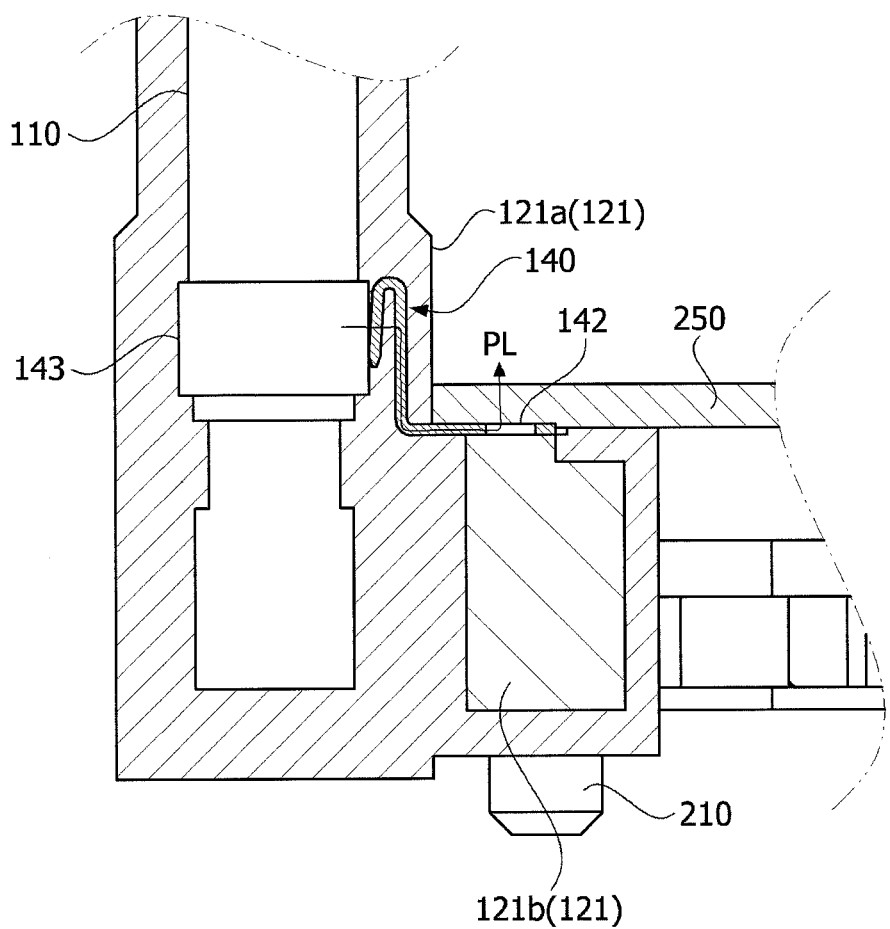
FIG. 11 is a conceptual diagram taken along line A-A' of FIG. 4 illustrating a state in which a pass line of electromagnetic wave noise is formed between an cable assembly and a motor.
Figure 12:
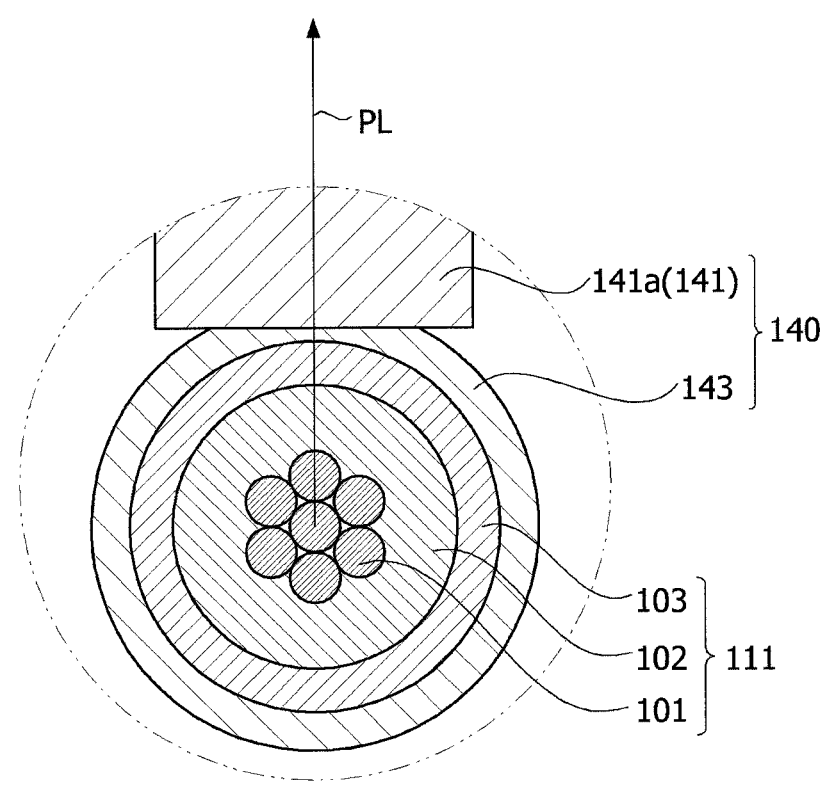
FIG. 12 is a view in which a ground terminal portion and an electromagnetic wave shielding layer of a cable are in contact with each other.

FIG. 11 is a conceptual diagram taken along line A-A' of FIG. 4 illustrating a state in which a pass line of electromagnetic wave is formed between the cable assembly and the motor, and FIG. 12 is a view in which the ground terminal portion and the electromagnetic wave shielding layer of the cable are in contact with each other.

Referring to FIGS. 11 and 12, the electromagnetic wave shielding layer 103 of the cable assembly 100 according to the embodiment of the present invention comes into contact with the cover 250 of the motor 200 via the ground terminal portion 140. Accordingly, an electromagnetic wave pass line (PL) is formed between the cable assembly 100 and the motor 200.

The first terminal 141 of the ground terminal portion 140 is disposed in the length direction of the cable 110 to be in contact with the electromagnetic wave shielding layer 103, and the second terminal 142 of the ground terminal portion 140 is disposed to be perpendicular to the length direction of the cable 110 to be in contact with the cover 250.

When the motor 200 is installed in a vehicle, electromagnetic waves flow through the ground with which the vehicle is in contact. That is, a grounding area widens because the cover 250 of the motor 200 and/or the housing 210 serve as the ground, thereby having an advantage of effectively removing the electromagnetic waves. The electromagnetic waves collected in the electromagnetic wave shielding layer 103 may be electromagnetic wave noise generated when a motor rotates at high-speed or an inverter is operated.

The cable assembly and the motor having the cable assembly according to preferred one embodiment of the present invention have been described with reference to the accompanying drawings.

According to the embodiment, the electromagnetic wave noise generated from an external power supply and motor can be effectively removed.

In addition, according to the embodiment, an advantageous effect of implementing a grounding arrangement at the cable assembly coupled to the motor in a vertical direction that is parallel with the shaft direction of the motor is provided by forming the first terminal and the second terminal of the ground terminal portion to be bent.

The above described one embodiment of the present invention should be considered in a descriptive sense only and not for the purpose of limitation and the scope of the present invention shall be represented according to the claims below rather than the foregoing detailed description of the embodiment. And, it should be interpreted that all the modifications or transformed forms originated from the sprit, scope and equivalent concept of the claims are comprised in the scope of the present invention.

REFERENCE NUMERALS

| | |
|---|---|
| 100: CABLE ASSEMBLY | 110: CABLE |
| 120: CONNECTOR | 121: BODY PORTION |
| 121a: FIRST BODY | 121b: SECOND BODY |
| 121c: SECOND ENGAGING PORTION | 122: POWER SUPPLY TERMINAL |
| 130: POWER SUPPLY CONNECTOR | 140: GROUND TERMINAL PORTION |
| 141: FIRST TERMINAL | 141a: BENT CONTACT SECTION |
| 141b: TERMINAL BODY | 142: SECOND TERMINAL |
| 142a: FIRST ENGAGING PORTION | 142b: GROUND PLANE |
| 142c: ELASTIC PRESSING PORTION | 150: CONNECTION MEMBER |
| 200: MOTOR | 210: HOUSING |
| 220: STATOR | 221: COIL |
| 230: BUS BAR | 240: ROTOR |
| 250: COVER | 260: ROTATING SHAFT |
| 270: BEARING | |

What is claimed is:

1. A motor comprising:
   a rotating shaft;
   a rotor comprising a hole in which the rotating shaft is disposed;
   a stator disposed outside of the rotor and comprising a coil;
   a bus bar connected to the coil and disposed at an upper side of the stator;
   a housing containing the rotor and the stator;
   a cover that covers the housing; and
   a cable assembly electrically connected to the bus bar, wherein the cable assembly comprises:
   a cable comprising a conductive core, an internal insulation layer and an electromagnetic wave shielding layer;
   a connector electrically connected to the cable; and
   a ground terminal portion disposed on the connector and comprising a first terminal electrically connected to the electromagnetic wave shielding layer and a second terminal disposed to be exposed outside the connector to be in contact with the cover,
   wherein the first terminal and the second terminal are connected by bending.

2. The motor of claim 1, wherein the ground terminal portion comprises a third terminal which electrically connects the electromagnetic wave shielding layer with the first terminal.

3. The motor of claim 2, wherein the first terminal comprises a terminal body formed to be bent from the second terminal in a length direction of the cable.

4. The motor of claim 3, wherein the second terminal forms a ground plane in a direction perpendicular to the terminal body of the first terminal.

5. The motor of claim 4, wherein the first terminal comprises a bent contact section formed to be bent from the terminal body to be in contact with the third terminal.

6. The motor of claim 5, wherein the third terminal is fitted to surround a perimeter of the electromagnetic wave shielding layer of the cable.

7. The motor of claim 6, wherein a plurality of third terminals into which a plurality of cables are individually inserted are provided, and the first terminal comprises a plurality of bent contact sections individually in contact with the plurality of third terminals.

8. The motor of claim 7, wherein the connector comprises:
   a body portion coupled to the cable and including the ground terminal portion; and
   a power supply terminal disposed in the body portion and formed to be bent from a length direction of the cable to electrically connect the conductive core of the cable with the bus bar.

9. The motor of claim 8, wherein the body portion comprises an open region formed to be perpendicular to the length direction of the cable to expose the second terminal.

10. The motor of claim 9, wherein the body portion comprises a second body having the power supply terminal and a first body portion connected to the second body and having the ground terminal portion.

11. The motor of claim 10, wherein the second terminal comprises a first engaging portion, and the second body having a second engaging portion for engaging with the first engaging portion.

12. The motor of claim 9, wherein the body portion comprises a stepped surface formed to be perpendicular to the length direction of the cable and configured to form an open region to expose the second terminal to be in contact with the cover.

13. The motor of claim 3, wherein the second terminal comprises an elastic pressing portion formed to protrude from the ground plane.

14. The motor of claim 13, wherein the elastic pressing portion is formed using a cut section for which the ground plane is cut to protrude.

15. The motor of claim 2, wherein the first terminal, the second terminal, and the third terminal are integrally formed.

\* \* \* \* \*